United States Patent
Komatsu et al.

(10) Patent No.: US 8,821,136 B2
(45) Date of Patent: Sep. 2, 2014

(54) SUPERCHARGER

(75) Inventors: Masaaki Komatsu, Nasukarasuyama (JP); Tetsuya Takezawa, Utsunomiya (JP); Junji Takado, Hiki-gun (JP); Toru Kamiya, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 695 days.

(21) Appl. No.: 12/909,599

(22) Filed: Oct. 21, 2010

(65) Prior Publication Data

US 2011/0097222 A1    Apr. 28, 2011

(30) Foreign Application Priority Data

Oct. 22, 2009  (JP) ................... 2009-243102

(51) Int. Cl.
| | | |
|---|---|---|
| F04D 29/58 | (2006.01) | |
| F04D 29/053 | (2006.01) | |
| F04D 29/043 | (2006.01) | |
| F04D 29/057 | (2006.01) | |
| F16C 37/00 | (2006.01) | |
| F16C 17/02 | (2006.01) | |
| H01M 8/04 | (2006.01) | |
| F04D 25/06 | (2006.01) | |

(52) U.S. Cl.
CPC ............. *F04D 29/5826* (2013.01); *Y02E 60/50* (2013.01); *F04D 29/057* (2013.01); *F16C 37/002* (2013.01); *F16C 17/024* (2013.01); *H01M 8/04089* (2013.01); *F16C 2360/42* (2013.01); *F04D 29/584* (2013.01); *F04D 29/5853* (2013.01); *F04D 25/0606* (2013.01)
USPC ................................................... 417/423.12

(58) Field of Classification Search
CPC ................................................ F04D 29/5853
USPC ..................... 417/405–409, 423.12
See application file for complete search history.

(56) References Cited

U.S. PATENT DOCUMENTS

| 4,385,787 A * | 5/1983 | Reisenweber et al. ........ 384/114 |
|---|---|---|
| 2004/0005228 A1 | 1/2004 | Agrawal et al. |
| 2008/0279684 A1* | 11/2008 | Saville ........................ 415/216.1 |
| 2009/0257895 A1* | 10/2009 | Takado et al. ............. 417/423.12 |
| 2012/0219439 A2* | 8/2012 | Takado et al. ............. 417/423.12 |

FOREIGN PATENT DOCUMENTS

| GB | 962277 | 7/1964 |
|---|---|---|
| JP | 9-509999 | 10/1997 |
| WO | 95/24563 A1 | 9/1995 |

OTHER PUBLICATIONS

European Search Report for Application No. 10187956.7, dated Jan. 21, 2011.

* cited by examiner

*Primary Examiner* — Bryan Lettman
(74) *Attorney, Agent, or Firm* — Nelson Mullins Riley & Scarborough LLP; Anthony A. Laurentano

(57) ABSTRACT

A supercharger includes a centrifugal compressor having an impeller, a rotational shaft coupled to the impeller, a motor having a stator and a rotor housed in a casing, and a journal air bearing supporting the rotational shaft. The journal air bearing includes a hollow cylindrical member having an inner space therein and a heat transfer member fitted in the inner space. The heat transfer member is made of a material which is less rigid and has a greater coefficient of thermal conductivity than the hollow cylindrical member. The impeller radiates heat transferred through the heat transfer member into ambient air.

9 Claims, 4 Drawing Sheets

SUPERCHARGER

CROSS-REFERENCE TO RELATED APPLICATION

This application is based upon and claims the benefit of priority from Japanese Patent Application No. 2009-243102 filed on Oct. 22, 2009, of which the contents are incorporated herein by reference.

BACKGROUND OF THE INVENTION

1. Field of the Invention

The present invention relates to a supercharger which includes a centrifugal compressor for compressing air with an impeller upon rotation thereof, a rotational shaft coupled to the impeller, a motor that comprises a stator mounted in a casing which houses the rotational shaft therein and a rotor mounted on the rotational shaft, and a journal bearing which holds the rotational shaft radially in position.

2. Description of the Related Art

Generally, centrifugal compressors are used as a supercharger for efficiently supplying compressed air. For example, they are used as an accessory for supplying compressed air to an engine or an accessory for supplying compressed air as an oxygen-containing gas to a fuel cell.

A centrifugal compressor comprises an annular stator and a rotor having a permanent magnet and disposed in the annular stator. The rotor rotates when windings on the stator are energized.

The rotor is mounted on a rotational shaft, which supports thereon an impeller for compressing air and a journal bearing that holds the rotational shaft radially in position. The impeller, the journal bearing, and the rotor which are mounted on the rotational shaft make up a rotary unit that is considerably heavy. In particular, since the components of the rotary unit are made of highly rigid materials to allow the rotor to rotate at a high speed, the rotary unit has a large weight as a whole.

When the heavy rotary unit is rotated at a high speed, its moment of rotary inertia is so large that it fails to perform an economic and efficient supercharging function.

There is known in the art a compressor disclosed in Japanese Laid-Open Patent Publication No. 09-509999 (PCT). The disclosed compressor comprises a rotatable shaft, a drive means for rotating the rotatable shaft, at least one impeller rotor stage mounted on the rotatable shaft, and a bearing means supporting the rotatable shaft. The rotatable shaft is substantially hollow in at least a portion thereof.

According to the above-mentioned Japanese Laid-Open Patent Publication No. 09-509999 (PCT), however, the rotatable shaft provides a heat transfer passage of reduced cross-sectional area because at least a portion of the rotatable shaft is hollow. Therefore, the amount of heat transferred from the rotor, or the journal bearing in particular, which generates much heat during rotation thereof, to the impeller rotor stage is reduced. The compressor thus fails to perform a good heat radiating function.

SUMMARY OF THE INVENTION

The present invention has been made to solve the above mentioned problems. It is an object of the present invention to provide a supercharger which is capable of reliably transferring heat from a heat generating region to an impeller coupled to a rotational shaft for an increased heat radiating capability particularly at the time the rotational shaft rotates at a high speed.

To achieve the above object, there is provided in accordance with the present invention a supercharger comprising a centrifugal compressor for compressing air with an impeller upon rotation thereof, a rotational shaft coupled to the impeller, a motor comprising a stator mounted in a casing which houses the rotational shaft therein and a rotor mounted on the rotational shaft, and a journal bearing holding the rotational shaft radially in position. The impeller, the journal bearing, and the motor are disposed on the rotational shaft successively in the order named from an end of the rotational shaft.

The journal bearing comprises a hollow cylindrical member having an inner space therein and a heat transfer member fitted in the inner space. The heat transfer member is made of a material which is less rigid and has a greater coefficient of thermal conductivity than the hollow cylindrical member. The impeller radiates heat transferred through the heat transfer member into ambient air.

As the journal bearing includes the hollow cylindrical member, the weight of a rotary unit which includes the impeller, the motor, the journal bearing, and the rotational shaft is relatively small. Since the heat transfer member is fitted in the inner space in the hollow cylindrical member, the impeller can radiate heat transferred through the heat transfer member into ambient air. It is thus possible to reliably transfer heat from a heat generating region to the impeller for an increased heat radiating capability particularly at the time the rotational shaft rotates at a high speed.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
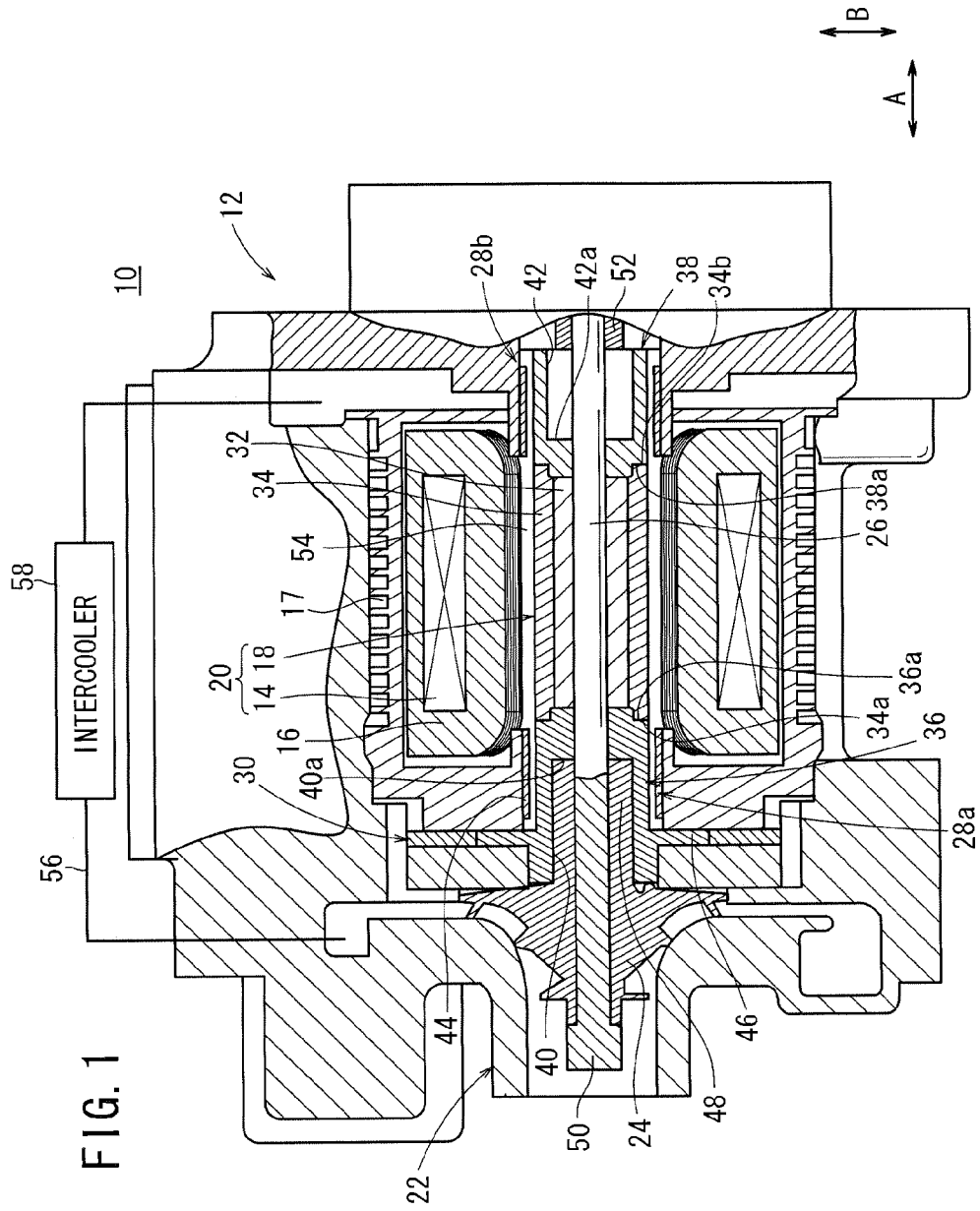
FIG. 1 is a cross-sectional view of a supercharger according to a first embodiment of the present invention.

As shown in FIG. 1, a supercharger 10 according to a first embodiment of the present invention, which may be used to supply compressed air as an oxygen-containing gas to a fuel cell, not shown, for example, comprises a casing 12 and an annular stator 14 mounted in the casing 12 with windings 16 wound on the stator 14.

A plurality of coolant water passages 17 are defined radially outwardly of the stator 14. The supercharger 10 also includes a rotor 18 disposed radially inwardly of the stator 14. The rotor 18 rotates about its own axis when the windings 16 are energized. The stator 14 and the rotor 18 jointly make up a motor 20. An impeller 24, which serves as part of a centrifugal compressor 22, is rotatably mounted on an axial end of the casing 12.

Figure 2:
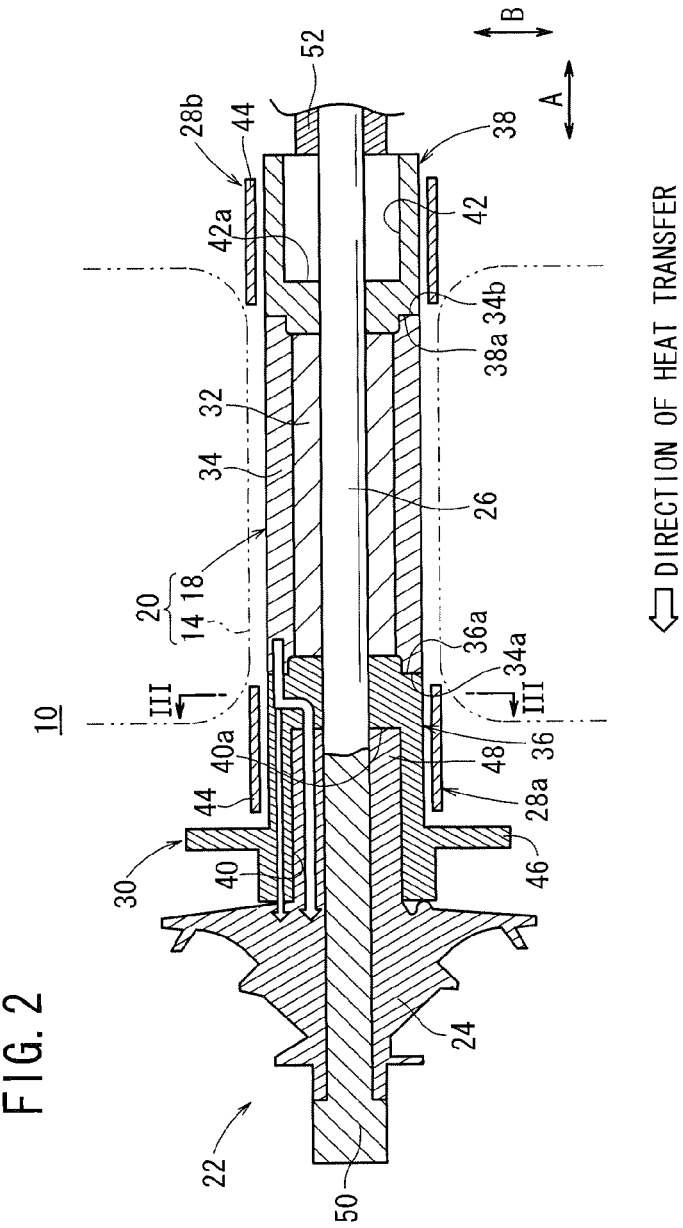
FIG. 2 is a cross-sectional view of central parts of the supercharger shown in FIG. 1.

As shown in FIGS. 1 and 2, the impeller 24 is coupled to an end portion of a rotational shaft 26 which extends axially through the casing 12. The impeller 24, a journal bearing 28a, e.g., a journal air bearing, the motor 20, and a journal bearing 28b, e.g., a journal air bearing, are disposed on the rotational shaft 26 successively in the order named from an end of the rotational shaft 26. A thrust air bearing 30 which holds the rotational shaft 26 axially in position is disposed between the impeller 24 and the journal air bearing 28a.

The rotor 18 comprises a hollow cylindrical permanent magnet 32 and a hollow cylindrical protective sleeve 34 disposed around the permanent magnet 32 and housing the permanent magnet 32 therein. The protective sleeve 34 is required to be of high rigidity, and is made of a superalloy of nickel, e.g., Inconel (registered trademark of Special Metals Corporation).

Hollow cylindrical members 36, 38 serving as bearing shafts are coupled to the respective opposite ends of the rotor 18 in an axial direction of the rotor 18. The hollow cylindrical members 36, 38 include respective cylindrical outer circumferential walls whose axial end faces 36a, 38a are held in contact with respective end faces 34a, 34b of the protective sleeve 34 of the rotor 18. The hollow cylindrical members 36, 38 have respective cylindrical inner spaces 40, 42 defined therein and respective closed end faces 40a, 42a at the ends of the inner spaces 40, 42 near the rotor 18.

The hollow cylindrical members 36, 38 serve as part of the journal air bearings 28a, 28b, respectively, and are made of Inconel, for example, as with the protective sleeve 34. The journal air bearings 28a, 28b comprise foil gas bearings, for example, and include ring members 44 disposed radially outwardly of the hollow cylindrical members 36, 38, respectively, with given clearances interposed therebetween. The ring members 44 are nonrotatably secured, and the hollow cylindrical members 36, 38 are rotatably supported by the ring members 44, respectively.

Figure 3:
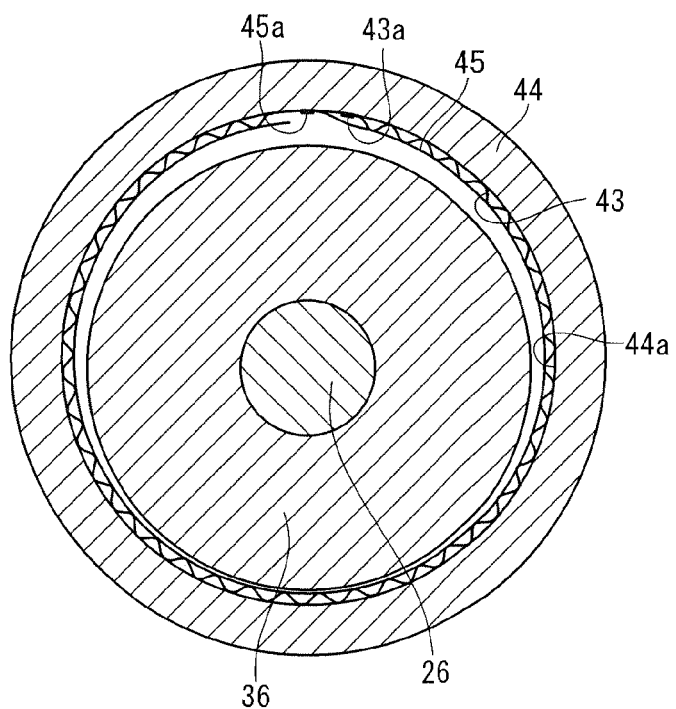
FIG. 3 is a cross-sectional view taken along line III-III of FIG. 2.

As shown in FIG. 3, each of the ring members 44 has an inner circumferential surface 44a on which there are disposed an undulated bump foil 43 and a planar top foil 45 in the order named. The bump foil 43 comprises a single foil or a plurality of foils and has an end 43a welded to the inner circumferential surface 44a of the ring member 44. The top foil 45 is curved into an annular shape and has an end 45a welded to the inner circumferential surface 44a of the ring member 44. The bump foil 43 and the top foil 45 have free ends opposite to their welded ends 43a, 45a. The hollow cylindrical member 36 includes a large-diameter flange 46 projecting radially outwardly from an outer circumferential surface thereof. The large-diameter flange 46 serves as the thrust air bearing 30.

As shown in FIG. 2, the journal air bearing 28a includes a heat transfer member 48 fitted in the inner space 40 in the hollow cylindrical member 36. The heat transfer member 48 is integral with the impeller 24. The heat transfer member 48 is made of a material which is less rigid and has a greater coefficient of thermal conductivity and a greater coefficient of thermal expansion than the hollow cylindrical member 36. For example, the heat transfer member 48 is made of copper or aluminum. The heat transfer member 48 is press-fitted or shrink-fitted in the inner space 40 in the hollow cylindrical member 36. The heat transfer member 48 is held in contact with the end face 40a of the hollow cylindrical member 36.

The rotational shaft 26 includes a large-diameter end 50 near the impeller 24. A stop member 52 is mounted on the other end of the rotational shaft 26 remote from the large-diameter end 50 (near the hollow cylindrical member 38). In an assembling process, after the impeller 24, the thrust air bearing 30, the journal air bearing 28a, the motor 20, and the journal air bearing 28b are held coaxially with each other, the rotational shaft 26 is inserted through these members, and then the stop member 52 is mounted on the rotational shaft 26. The impeller 24, the thrust air bearing 30, the journal air bearing 28a, the motor 20, the journal air bearing 28b, the rotational shaft 26, and the stop member 52 which are assembled together jointly make up a rotary unit.

As shown in FIG. 1, the casing 12 has a coolant passageway 54 defined therein between the protective sleeve 34 and the windings 16 (essentially the stator 14) of the motor 20. The coolant passageway 54 has an inlet held in fluid communication with a coolant pipe 56 which in turn is held in fluid communication with the centrifugal compressor 22. The coolant pipe 56 is connected to an intercooler 58.

Operation of the supercharger 10 will be described below.

When the windings 16 of the motor 20 are energized, the permanent magnet 32 and the protective sleeve 34 of the rotor 18 rotates in unison with the rotational shaft 26. The impeller 24 mounted on the rotational shaft 26 rotates at a relatively high speed, drawing in ambient air through the centrifugal compressor 22.

The air drawn in by the impeller 24 is compressed by the centrifugal compressor 22 and delivered to, for example, an oxygen-containing gas supply system of a fuel cell, not shown. The fuel cell is also supplied with a fuel gas (hydrogen gas) from a fuel gas supply system, not shown. Therefore, the fuel cell generates electricity due to a reaction between the air supplied to a cathode and the hydrogen supplied to an anode.

Part of the air drawn in and compressed by the centrifugal compressor 22 flows through the coolant pipe 56 into the intercooler 58, which cools the air. The cooled air is then supplied as coolant air to the coolant passageway 54 in the casing 12. The coolant air flows through the coolant passageway 54, cooling the motor 20, and is then discharged out of the supercharger 10.

When the rotational shaft 26 rotates at a high speed, the permanent magnet 32 of the motor 20 generates an eddy current, which tends to heat the surface of the rotor 18. The journal air bearings 28a, 28b also tend to generate heat upon rotation of the rotational shaft 26.

According to the first embodiment, the hollow cylindrical members 36, 38 are used as the bearing shafts of the journal air bearings 28a, 28b. Therefore, the rotary unit is relatively lightweight as a whole. As described above, the heat transfer member 48 is fitted in the inner space 40 in the hollow cylindrical member 36.

The hollow cylindrical member 36 is made of a highly strong and rigid material such as Inconel or the like, for example. The heat transfer member 48 is made of a material whose coefficient of thermal conductivity is greater than the hollow cylindrical member 36, e.g., copper or aluminum. As shown in FIG. 2, the heat generated on the surface of the rotor 18 and the heat generated in the journal air bearing 28a are transferred through the heat transfer member 48 to the impeller 24. The impeller 24 as it rotates at a high speed can radiate the transferred heat into the surrounding air.

Consequently, when the rotational shaft 26 rotates at a high speed, the heat is reliably transferred from the rotor 18 and the journal air bearing 28a to the impeller 24, and hence radiated well from the impeller 24.

The heat transfer member 48 is made of a material whose coefficient of thermal expansion is greater than the hollow cylindrical member 36, e.g., aluminum. The heat transfer member 48 disposed in contact with the end face 40a of the end of the inner space 40 in the hollow cylindrical member 36 near the rotor 18. Therefore, even when the temperature of the heat transfer member 48 drops to reduce the degree of contact between the outer circumferential surface of the heat transfer member 48 and the inner circumferential surface of the hollow cylindrical member 36, the heat transfer member 48 remains effective to transfer the heat because it is held in contact with the end face 40a of the hollow cylindrical member 36.

The supercharger 10 includes the thrust air bearing 30 disposed between the impeller 24 and the journal air bearing 28a. The thrust air bearing 30 comprises the large-diameter flange 46 integral with the outer circumferential surface of the hollow cylindrical member 36. When the hollow cylindrical member 36 rotates in unison with the rotational shaft 26, the large-diameter flange 46 rotates at a high peripheral speed for radiating heat therefrom efficiently.

The axial end face 36a of the hollow cylindrical member 36 and the corresponding end face of the rotor 18 are held in contact with each other. Therefore, the heat generated on the surface of the rotor 18 by the eddy current can reliably be transferred to and radiated from the impeller 24. Furthermore, as the end face 34a of the hollow cylindrical protective sleeve 34 which houses the permanent magnet 32 is held in contact with the axial end face 36a of the hollow cylindrical member 36, the amount of heat generated on the surface of the rotor 18 and transferred to the permanent magnet 32 is effectively reduced.

Figure 4:
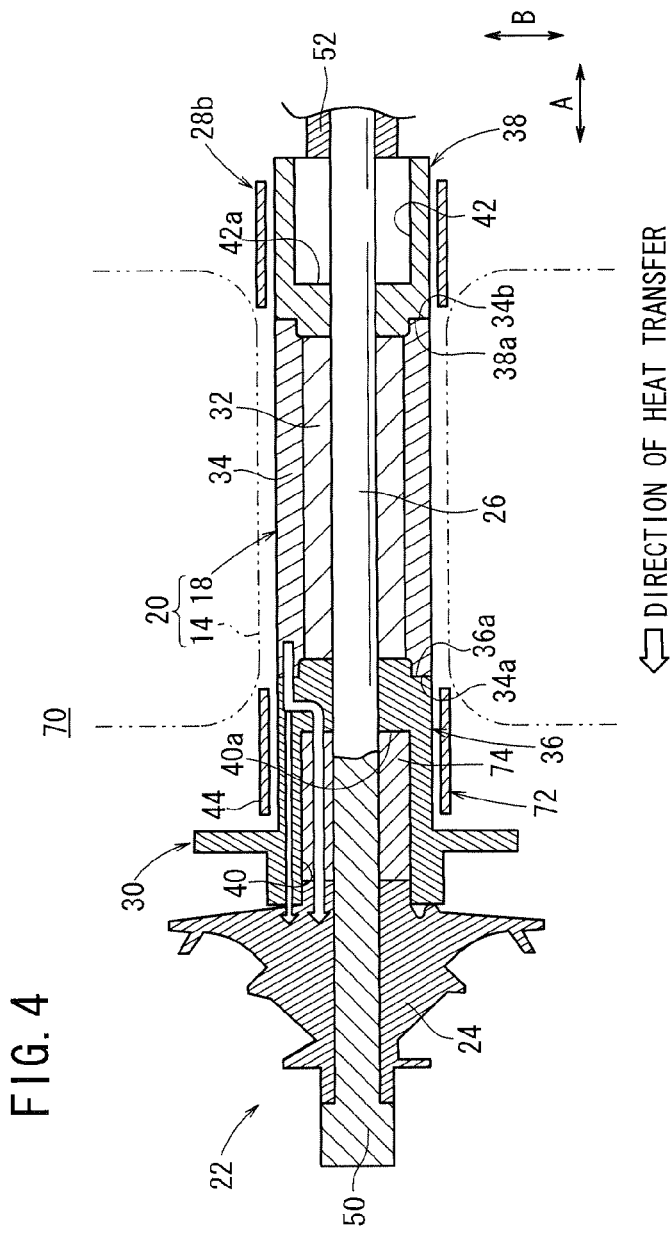
FIG. 4 is a cross-sectional view of central parts of a supercharger according to a second embodiment of the present invention.

FIG. 4 is an axial cross-sectional view of central parts of a supercharger 70 according to a second embodiment of the present invention. Those parts of the supercharger 70 which are identical to those of the supercharger 10 according to the first embodiment are denoted by identical reference characters, and will not be described in detail below.

As shown in FIG. 4, the supercharger 70 includes a journal air bearing 72 such as a foil gas bearing, in place of the journal air bearing 28a according to the first embodiment. The journal air bearing 72 includes a heat transfer member 74 fitted in the inner space 40 in the hollow cylindrical member 36. The heat transfer member 74 is in the form of a hollow cylinder and is separate from the impeller 24.

As with the heat transfer member 48 according to the first embodiment, the heat transfer member 74 is made of a material which is less rigid and has a greater coefficient of thermal conductivity and a greater coefficient of thermal expansion than the hollow cylindrical member 36. Specifically, the heat transfer member 74 is made of copper or aluminum. The heat transfer member 74 is held in contact with the end face 40a of the hollow cylindrical member 36, and is press-fitted or shrink-fitted in the inner space 40 in the hollow cylindrical member 36.

According to the second embodiment, the journal air bearing 72 comprises the hollow cylindrical member 36 and the heat transfer member 74. The supercharger 70 offers the same advantages as the supercharger 10 according to the first embodiment. In addition, since the heat transfer member 74 is separate from the impeller 24, the heat transfer member 74 may be in the form of a simple hollow cylinder. Consequently, the heat transfer member 74 can be manufactured according to a significantly simple process.

Although certain preferred embodiments of the present invention have been shown and described in detail, it should be understood that various changes and modifications may be made therein without departing from the scope of the appended claims.

What is claimed is:

1. A supercharger comprising:
   a centrifugal compressor for compressing air with an impeller upon rotation thereof;
   a rotational shaft coupled to the impeller;
   a motor comprising a stator mounted in a casing which houses the rotational shaft therein and a rotor mounted on the rotational shaft; and
   a journal bearing holding the rotational shaft radially in position;
   wherein the impeller, the journal bearing, and the motor are disposed on the rotational shaft successively in the order named from an end of the rotational shaft;
   the journal bearing comprises a hollow cylindrical member having an inner space therein and a heat transfer member fitted in the inner space, wherein the journal bearing has a closed end face that at least in part defines the inner space, the closed end face being located at a position nearer to the rotor than the impeller in an axial direction, and wherein the heat transfer member is disposed in contact with the closed end face and fitted in the inner space;
   the heat transfer member is made of a material which is less rigid and has a greater coefficient of thermal conductivity than the hollow cylindrical member; and
   the impeller radiates heat transferred through the heat transfer member into ambient air.

2. A supercharger according to claim 1, wherein the heat transfer member is made of a material which has a greater coefficient of thermal expansion than the hollow cylindrical member.

3. A supercharger according to claim 1, further comprising a thrust air bearing disposed between the impeller and the journal bearing, the thrust air bearing holding the rotational shaft axially in position.

4. A supercharger according to claim 1, wherein the hollow cylindrical member includes a cylindrical outer circumferential wall having an axial end face disposed in contact with an axial end face of the rotor.

5. A supercharger according to claim 4, wherein the rotor comprises:
   a hollow cylindrical permanent magnet; and
   a hollow cylindrical protective sleeve housing the permanent magnet therein; and
   the hollow cylindrical protective sleeve has an axial end face disposed in contact with the axial end face of the hollow cylindrical member.

6. A supercharger according to claim 1, wherein the heat transfer member is integral with the impeller.

7. A supercharger according to claim 1, wherein the heat transfer member is separate from the impeller.

8. A supercharger according to claim 1, wherein the journal bearing comprises a journal air bearing.

9. A supercharger according to claim 1, wherein the supercharger supplies compressed air as an oxygen-containing gas to a fuel cell.

* * * * *